United States Patent
Cho et al.

(10) Patent No.: US 10,340,681 B2
(45) Date of Patent: Jul. 2, 2019

(54) POWER MANAGEMENT SYSTEM COMPRISING STATIC PROTECTING CIRCUIT AND RELATED METHOD OF OPERATION

(71) Applicant: SAMSUNG ELECTRONICS CO., LTD., Suwon-si, Gyeonggi-eo (KR)

(72) Inventors: Sang-Ik Cho, Seoul (KR); Hyoung-Seok Oh, Seoul (KR); Je-Hyung Yoon, Seoul (KR); Yoo-Jun Jeong, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 932 days.

(21) Appl. No.: 14/554,111

(22) Filed: Nov. 26, 2014

(65) Prior Publication Data

US 2015/0205338 A1   Jul. 23, 2015

(30) Foreign Application Priority Data

Jan. 23, 2014   (KR) .................. 10-2014-0008577

(51) Int. Cl.
*H02H 7/12*   (2006.01)
*H02M 1/32*   (2007.01)
*G06F 1/30*   (2006.01)

(52) U.S. Cl.
CPC ............. *H02H 7/12* (2013.01); *G06F 1/30* (2013.01); *H02H 7/1213* (2013.01); *H02M 1/32* (2013.01)

(58) Field of Classification Search
CPC ........... G06F 1/30; H02M 1/082; H02M 1/32; H02H 7/1213; H02H 7/10; H02H 7/12
See application file for complete search history.

(56) References Cited

U.S. PATENT DOCUMENTS

| | | | |
|---|---|---|---|
| 7,518,430 B2 | 4/2009 | Dequina et al. | |
| 2005/0258808 A1* | 11/2005 | Chen | H02H 7/1213 323/222 |
| 2011/0169470 A1* | 7/2011 | Itakura | H02M 1/32 323/282 |
| 2012/0313600 A1* | 12/2012 | Saito | H02M 3/1588 323/282 |
| 2013/0063121 A1 | 3/2013 | Kasai | |

(Continued)

FOREIGN PATENT DOCUMENTS

KR   10-1266798   5/2013

OTHER PUBLICATIONS

'A Monolithic Current-Mode Buck Converter With Advanced Control and Protection Circuits' Published in Power Electronics, IEEE Transactions on (vol. 22, Issue: 5 ) on Sep. 2007.

*Primary Examiner* — Ronald W. Leja
*Assistant Examiner* — Christopher Clark
(74) *Attorney, Agent, or Firm* — Volentine, Whitt & Francos, PLLC

(57) ABSTRACT

A power management system comprises a power converter comprising a power stage and configured to detect an abnormal static state of the power stage, to generate a protection signal in response to the detection of the abnormal static state of the power stage, and to stabilize a direct current (DC) power supply voltage in response to an enable signal to generate a DC output voltage, and a main control circuit configured to generate the enable signal for the power converter based on the protection signal received from the power converter.

19 Claims, 10 Drawing Sheets

(56) References Cited

U.S. PATENT DOCUMENTS

2014/0132233 A1* 5/2014 Park ............... H02H 7/1213
                                              323/272
2015/0115910 A1* 4/2015 Jiang ............... H02M 3/1584
                                              323/271

* cited by examiner

POWER MANAGEMENT SYSTEM COMPRISING STATIC PROTECTING CIRCUIT AND RELATED METHOD OF OPERATION

CROSS-REFERENCE TO RELATED APPLICATION

This application claims priority under 35 U.S.C. § 119 to Korean Patent Application No. 10-2014-0008577 filed on Jan. 23, 2014, the disclosure of which is hereby incorporated by reference in its entirety.

BACKGROUND OF THE INVENTION

The inventive concept relates generally to power management for electronic applications. More particularly, certain embodiments of the inventive concept relate to power management systems comprising power converters and related methods of operation.

Power management is of great concern in many electronic applications. For example, various applications rely on power management to enhance battery life, to prevent overheating, to reduce cost, to enhance performance, and so on.

Many electronic systems perform power management using a switch mode power supply such as a step-down converter, a boost converter, or a buck-boost converter. Certain other electronic systems perform power management using multiple power converters.

SUMMARY OF THE INVENTION

In one embodiment of the inventive concept, a power management system comprises a power converter comprising a power stage and configured to detect an abnormal static state of the power stage, to generate a protection signal in response to the detection of the abnormal static state of the power stage, and to stabilize a direct current (DC) power supply voltage in response to an enable signal to generate a DC output voltage, and a main control circuit configured to generate the enable signal for the power converter based on the protection signal received from the power converter.

In another embodiment of the inventive concept, a method is provided for controlling a power management system comprising a power converter. The method comprises determining whether a protection state is generated in the power converter, disabling the power converter where the protection state is generated in the power management system, else enabling the power convertor, determining whether a switch node of a power stage in the power converter is shorted to a DC power supply voltage or whether an inductor in an inductor-capacitor circuit of the power stage is floated from the switch node of the power stage, and as a consequence of determining that the switch node of the power stage in the power converter is shorted to the DC power supply voltage or that the inductor in the inductor-capacitor circuit is floated from the switch node of the power stage, disabling blocks related to power conversion in the power converter.

These and other embodiments of the inventive concept can potentially prevent damage to components of a power management system and improve various operational characteristics.

BRIEF DESCRIPTION OF THE DRAWINGS

The drawings illustrate selected embodiments of the inventive concept. In the drawings, like reference labels indicate like features.

DETAILED DESCRIPTION

Embodiments of the inventive concept are described below with reference to the accompanying drawings. These embodiments are provided as teaching examples and should not be construed to limit the scope of the inventive concept.

In the description that follows, where a feature is referred to as being, e.g., "on" or "connected to" another feature, it can be directly on or connected to the other feature, or intervening features may be present. In contrast, where a feature is referred to as being "directly on" or "directly connected to," another feature, there are no intervening features present. As used herein, the term "and/or" includes any and all combinations of one or more of the associated listed items.

The terms "first," "second," "third," etc., may be used herein to describe various features, but the described features should not be limited by these terms. Rather, these terms are only used to distinguish one feature from another. Thus, a first feature could be termed a second feature without departing from the teachings of the inventive concept. The terminology used herein is for the purpose of describing particular embodiments only and is not intended to limit the inventive concept. As used herein, the singular forms "a," "an," and "the" are intended to include the plural forms as well, unless the context clearly indicates otherwise. Terms such as "comprises" and/or "comprising," where used herein, specify the presence of stated features but do not preclude the presence or addition of one or more other features.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal detect unless expressly so defined herein.

Figure 1:
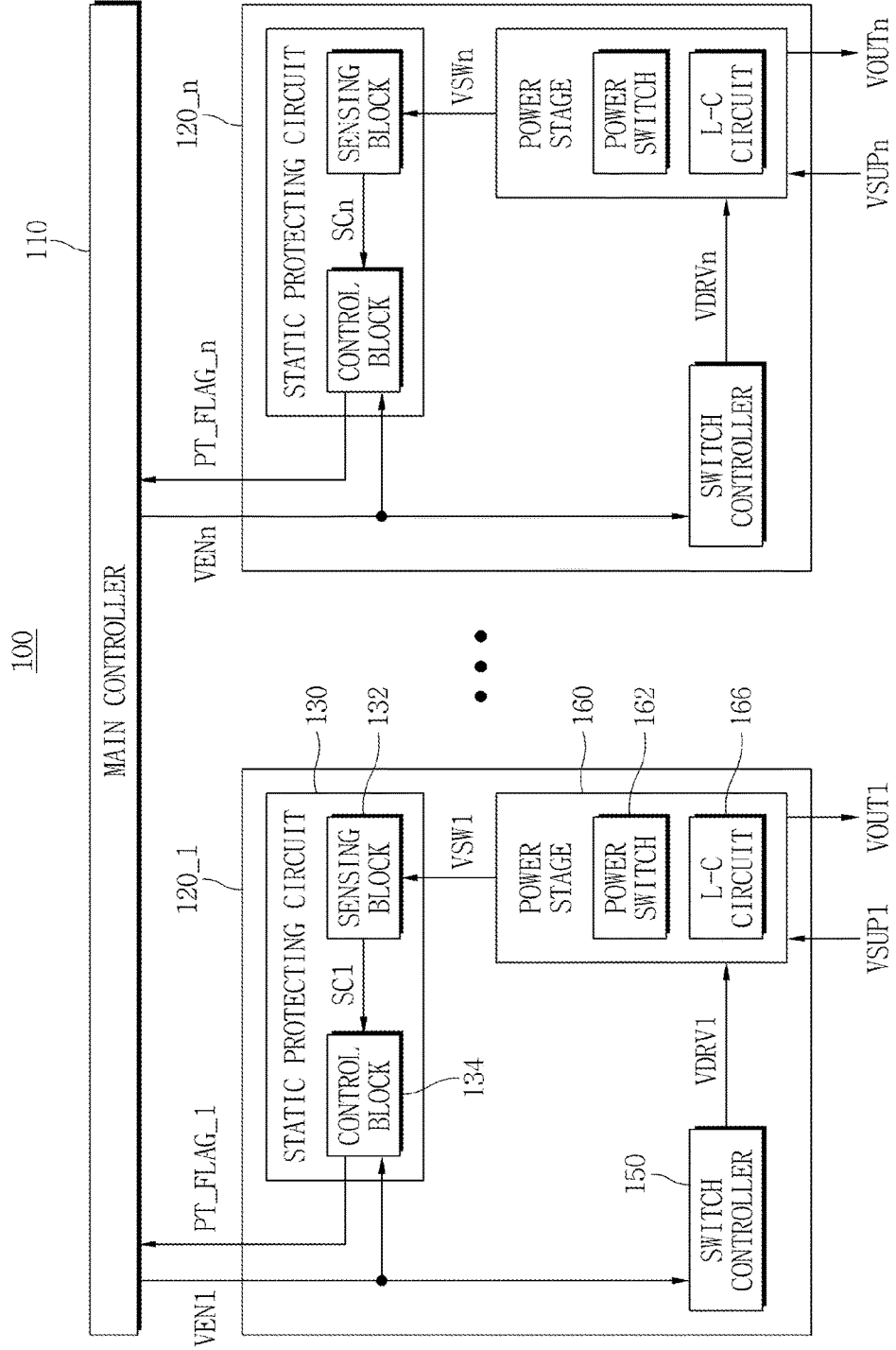
FIG. 1 is a block diagram illustrating a power management system in accordance with an embodiment of the inventive concept.

FIG. 1 is a block diagram illustrating a power management system 100 in accordance with an embodiment of the inventive concept.

Referring to FIG. 1, power management system 100 comprises power converters 120_1 to 120_n and a main controller 110. Each of power converters 120_1 to 120_n comprises a static protecting circuit 130, a switch controller 150, and power stage 160.

Each of power converters 120_1 to 120_n is configured to detect an abnormal static state of the corresponding power stage 160, to generate a corresponding one of protection signals PT_FLAG_1 to PT_FLAG_n in response to the detection of the abnormal static state, and to stabilize a corresponding one of DC power supply voltages VSUP1 to VSUPn in response to a corresponding one of enable signals VEN1 to VENn to generate DC output voltages VOUT1 to VOUTn.

Main controller 110 generates enable signals VEN1 to VENn for the respective power converters 120_1 to 120_n based on the respective protection signals PT_FLAG_1 to PT_FLAG_n received from the respective power converters 120_1 to 120_n.

Static protecting circuit 130, switch controller 150, and power stage 160 will be described with reference to power converter 120_1. However, a similar description could be applied to the features of other power converters 120_2 to 120_n.

Static protecting circuit 130 is enabled in response to enable signal VEN1, detects a voltage of a switch node of power stage 160, and generates protection signal PT_FLAG_1. Switch controller 150 is enabled in response to enable signal VEN1, and it generates a switch driving signal VDRV1. Power stage 160 comprises a power switch 162 and an inductor-capacitor (L-C) circuit 166, and power switch 162, and it stabilizes DC power supply voltage VSUP1 in response to switch driving signal VDRV1 to generate the DC output voltage VOUT1.

The abnormal static state may be, for instance, a state in which a switch node of power stage 160 is shorted to DC power supply voltage VSUP1, a state in which the switch node of power stage 160 is shorted to a ground voltage, a state in which an inductor in an L-C circuit 166 is floated from the switch node of power stage 160, or a state in which DC power supply voltage VSUP1 is floated from power stage 160.

The abnormal static state may be generated by a subset of power converters 120_1 to 120_n, referred to hereafter as "first power converters". Under those circumstances, the first power converters generate corresponding protection signals among protection signals PT_FLAG_1 to PT_FLAG_n, and main controller 110 responds by disabling corresponding enable signals among enable signals VEN1 to VENn.

Power management system 100 shown in FIG. 1 determines whether abnormal static states are generated, and it disables circuits in the power converters before a normal operation starts. By doing so, power management system 100 may protect power transistors in the power converters and reduce power consumption.

In power management system 100 of FIG. 1, static protecting circuit 130, switch controller 150, and power switch 162 may be embedded in one power management integrated circuit (PMIC). Main controller 110 may also be embedded in the one PMIC.

Figure 2:
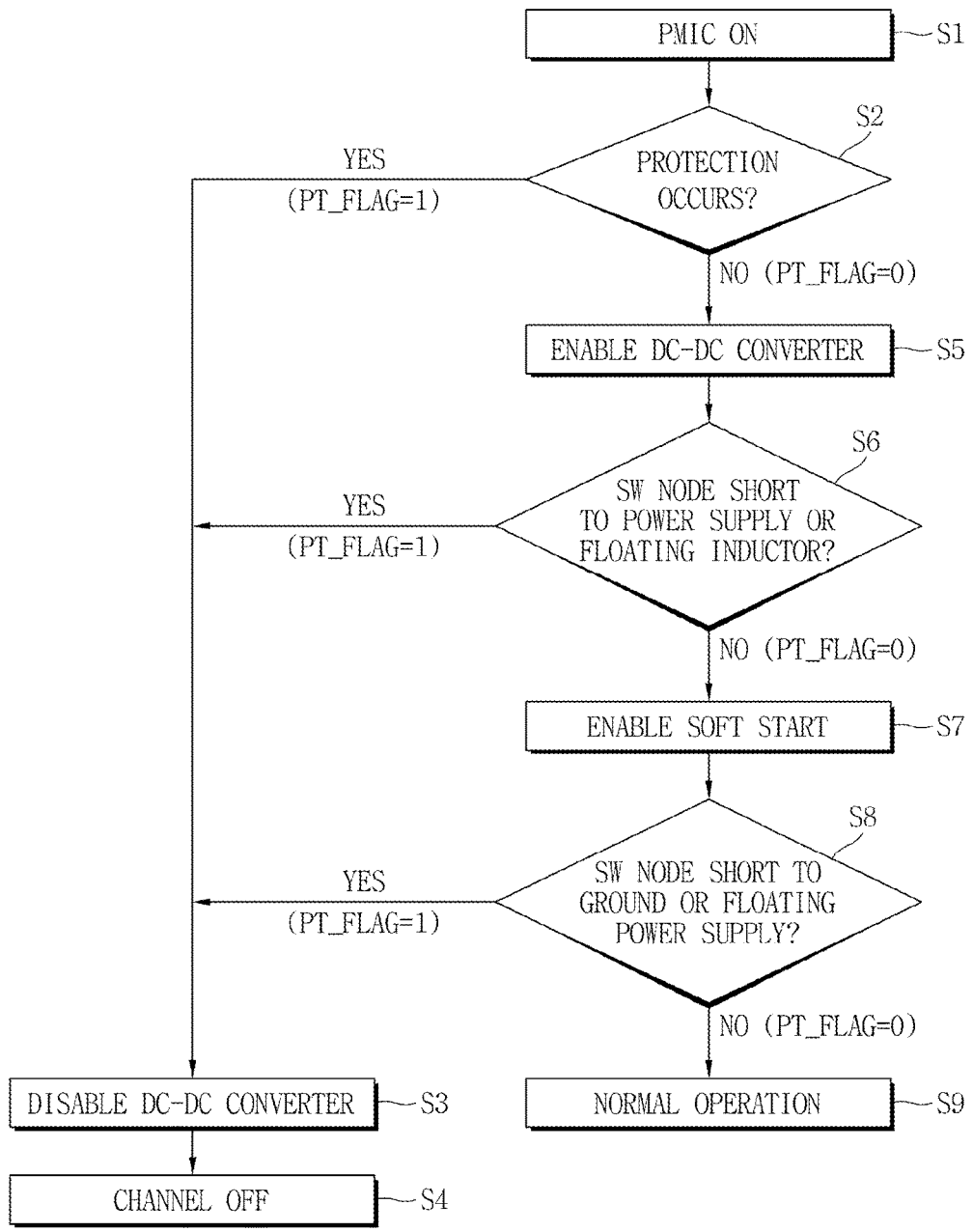
FIG. 2 is a flowchart illustrating a method of controlling a power management system in accordance with an embodiment of the inventive concept.

FIG. 2 is a flowchart illustrating a method of controlling a power management system in accordance with an embodiment of the inventive concept. For explanation purposes, it will be assumed that the power management system has the form illustrated in FIG. 1, with main controller 110 and power converters 120_1 to 120_n embedded in one PMIC. In the description that follows, example method steps will be indicated by parentheses.

Referring to FIG. 2, the method comprises turning on the PMIC (S1) and determining whether a protection state is generated in the power management system (S2). Upon determining that the protection state is generated in the power management system (S2=Yes), the method disables power converters (S3). Otherwise (S2=No), upon determining that the protection state is not generated in the power management system, the method enables the power convertors (S5) and then determines whether the power converters include first power converters in which a switch node of the power stage is shorted to the DC power supply voltage or whether the power converters include second power converters in which an inductor in an L-C circuit is floated from the switch node of the power stage (S6).

Upon determining that the power converters include such first or second power converters (S6=Yes), the method disables blocks related to power conversion of a power management integrated circuit in each of the first power converters and the second power converters (S3). Otherwise (S6=No), the method performs a soft-start operation on the power converters (S7) and then determines whether the power converters include third power converters in which a switch node of the power stage is shorted to a ground voltage or fourth power converters in which the DC power supply voltage is floated from the power stage (S8).

Upon determining that the power converters include such third or fourth power converters (S8=Yes), the method disables blocks related to power conversion of a power management integrated circuit in each of the third power converters and the fourth power converters (S3). Otherwise (S8=No), the method performs a normal operation on the power converters (S9).

In some embodiments, the method further comprises turning off channels (S4) between the power converters and the main control circuit after the power converters are disabled (S3) in response to generation of the protection state.

Figure 3:
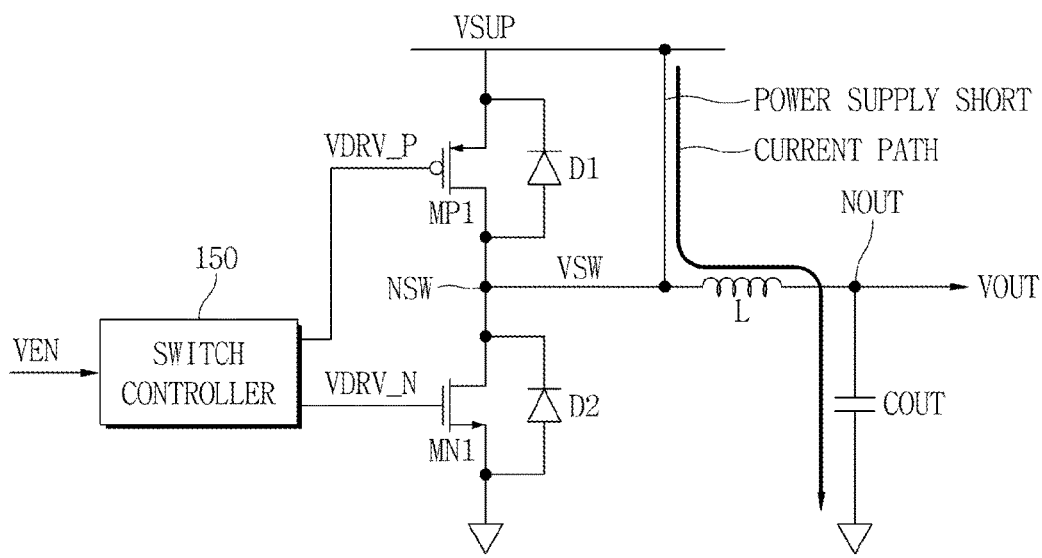
FIG. 3 is a circuit diagram illustrating a switch control circuit and a power stage of power converters in the power management system of FIG. 1 in accordance with an embodiment of the inventive concept.

FIG. 3 is a circuit diagram illustrating an example of switch controller 150 and a power stage of power converters in the power management system of FIG. 1. In FIG. 3, the power stage is shown in the form of a buck converter, although other variations are possible. The illustrated features are shown under conditions where a switch node of the power stage is shorted to a DC power supply voltage.

Referring to FIG. 3, the power stage comprises a first power switch, a second power switch, an inductor L, and a capacitor COUT. The first power switch comprises a PMOS power transistor MP1 and a diode D1. The second power switch comprises an NMOS power transistor MN1 and a diode D2.

The first power switch is connected between a DC power supply voltage VSUP and a switch node NSW of the power stage, and is configured to perform a switch operation in response to a first switch driving signal VDRV_P. The second power switch is connected between switch node NSW of the power stage and a ground voltage, and is configured to perform a switch operation in response to a second switch driving signal VDRV_N. Inductor L is connected between switch node NSW of the power stage and an output node NOUT. Capacitor COUT is connected between output node NOUT and the ground voltage.

PMOS power transistor MP1 is connected between DC power supply voltage VSUP and switch node NSW of the power stage, and is configured to perform a switching operation in response to first switch driving signal VDRV_P. Diode D1 has an anode connected to switch node NSW of the power stage and a cathode connected to DC power supply voltage VSUP.

NMOS power transistor MN1 is connected between switch node NSW of the power stage and the ground voltage, and is configured to perform a switch operation in response to second switch driving signal VDRV_N. Diode D2 has an anode connected to the ground voltage and a cathode connected to switch node NSW of the power stage.

As the power stage of FIG. 3 is a buck converter, the DC output voltage VOUT may have a level lower than DC power supply voltage VSUP applied to the power converter having the power stage. In a normal state where switch node NSW of the power stage is not shorted to DC power supply voltage VSUP, power management system 100 of FIG. 1 including the power stage of FIG. 3 may operate as follows.

Where first switch driving signal VDRV_P and second switch driving signal VDRV_N have logic low states, PMOS power transistor MP1 is turned on and NMOS power transistor MN1 is turned off. Further, diode D1 and diode D2 are turned off. Under these conditions, current flows through PMOS power transistor MP1, inductor L, and capacitor COUT. Further, the current flowing through inductor L may flow through a load (not shown) connected to output node NOUT.

Where first switch driving signal VDRV_P and second switch driving signal VDRV_N have logic high states, PMOS power transistor MP1 is turned off and NMOS power transistor MN1 is turned on. Further, diode D1 and diode D2 are turned off. Under these conditions, current flows through NMOS power transistor MN1, inductor L, and capacitor COUT. Further, the current flowing through inductor L may flow through a load (not shown) connected to output node NOUT.

Where first switch driving signal VDRV_P has a logic high state and second switch driving signal VDRV_N has a logic low state, both PMOS power transistor MP1 and NMOS power transistor MN1 are turned off. Further, diode D1 is turned off and diode D2 is turned on. Under these conditions, current flows through diode D2, inductor L, and capacitor COUT. Further, the current flowing through inductor L may flow through a load (not shown) connected to output node NOUT.

In a normal state, switch controller 150 generates first switch driving signal VDRV_P and second switch driving signal VDRV_N based on enable signal VEN received from main controller 110.

Where the protection state is generated, for example, where switch node NSW of the power stage is shorted to DC power supply voltage VSUP, power management system 100 of FIG. 1 including the power stage of FIG. 3 may operate as follows.

Where switch node NSW of the power stage is shorted to DC power supply voltage VSUP, static protecting circuit 130 detects a voltage VSW1 of switch node NSW of power stage 160 and enables protection signal PT_FLAG_1. Where protection signal PT_FLAG_1 is enabled, main controller 110 disables enable signal VEN1 based on protection signal PT_FLAG_1. Under these conditions, switch controller 150 is disabled and switch driving signal VDRV1 is disabled.

Switch driving signal VDRV1 comprises first switch driving signal VDRV_P and second switch driving signal VDRV_N. Where switch node NSW of the power stage is shorted to DC power supply voltage VSUP, first switch driving signal VDRV_P has a logic high state and second switch driving signal VDRV_N has a logic low state. Under these conditions, both PMOS transistor MP1 and NMOS transistor MN1 are turned off. Therefore, where switch node NSW of the power stage is shorted to DC power supply voltage VSUP, damage to NMOS transistor MN1 is prevented by turning off NMOS transistor MN1. Further, where switch node NSW of the power stage is shorted to DC power supply voltage VSUP, static protecting circuit 130 may be disabled in response to enable signal VEN1 received from main controller 110.

As indicated by the foregoing, where power converters 120_1 to 120_n include the first power converters in which switch node NSW of the power stage is shorted to DC power supply voltage VSUP, the first power converter generates and provide respective protection signals PT_FLAG_1 to PT_FLAG_n to main controller 110, and main controller 110 disables enable signals VEN1 to VENn applied to the first power converters based on protection signals PT_FLAG_1 to PT_FLAG_n.

Figure 4:
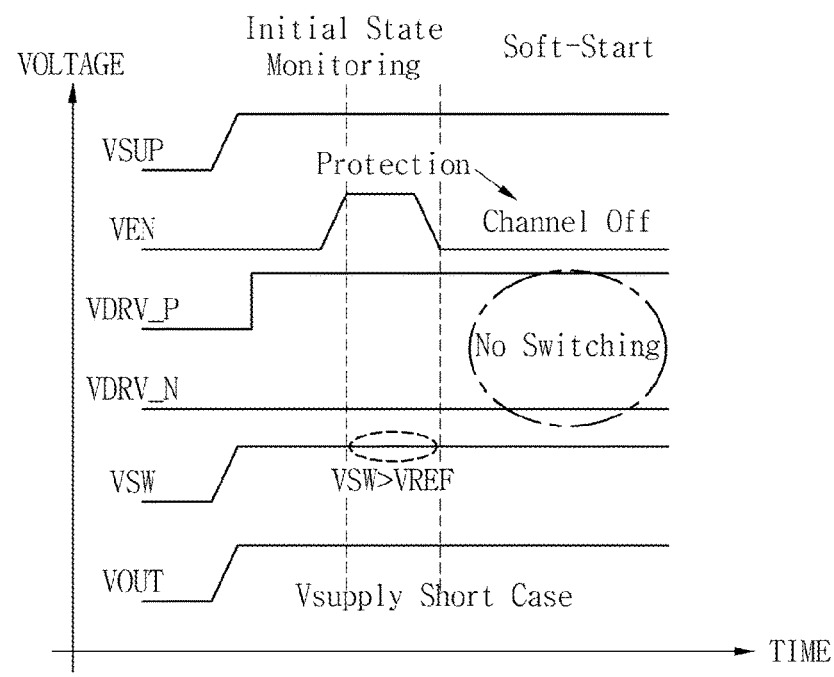
FIG. 4 is a timing diagram illustrating operations of the power management system of FIG. 1 in accordance with an embodiment of the inventive concept.
Figure 5:
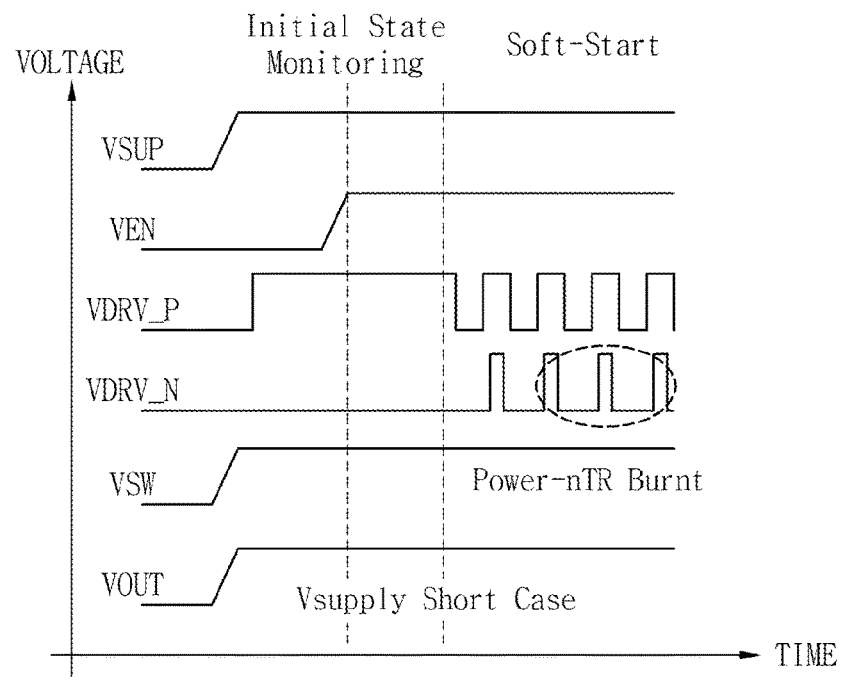
FIG. 5 is a timing diagram illustrating operations of a reference power management system.

FIG. 4 is a timing diagram illustrating operations of the power management system of FIG. 1 where a switch node of the power stage is shorted to a DC power supply voltage, and FIG. 5 is a timing diagram illustrating operations of a reference power management system where a switch node of the power stage is shorted to a DC power supply voltage.

Referring to FIG. 4, where switch node NSW of the power stage is shorted to DC power supply voltage VSUP and a voltage VSW of switch node NSW of the power stage is higher than a reference voltage VREF, main controller 110 disables enable signal VEN and maintains first switch driving signal VDRV_P that drives PMOS power transistor MP1 at a logic high state and second switch driving signal VDRV_N that drives NMOS power transistor MN1 at a logic low state. Under these conditions, PMOS power transistor MP1 and NMOS power transistor MN1 do not perform a switching operation. Therefore, where switch node NSW of the power stage is shorted to DC power supply voltage VSUP, damage to NMOS power transistor MN1 is prevented.

Referring to FIG. 5, in the reference power management system, where switch node NSW of the power stage is shorted to DC power supply voltage VSUP, both first switch driving signal VDRV_P and second switch driving signal VDRV_N have pulse waveforms, and PMOS power transistor MP1 and NMOS power transistor MN1 perform a switching operation. Therefore, in the reference power management system, where switch node NSW of the power stage is shorted to DC power supply voltage VSUP, the NMOS power transistor may be damaged.

Figure 6:
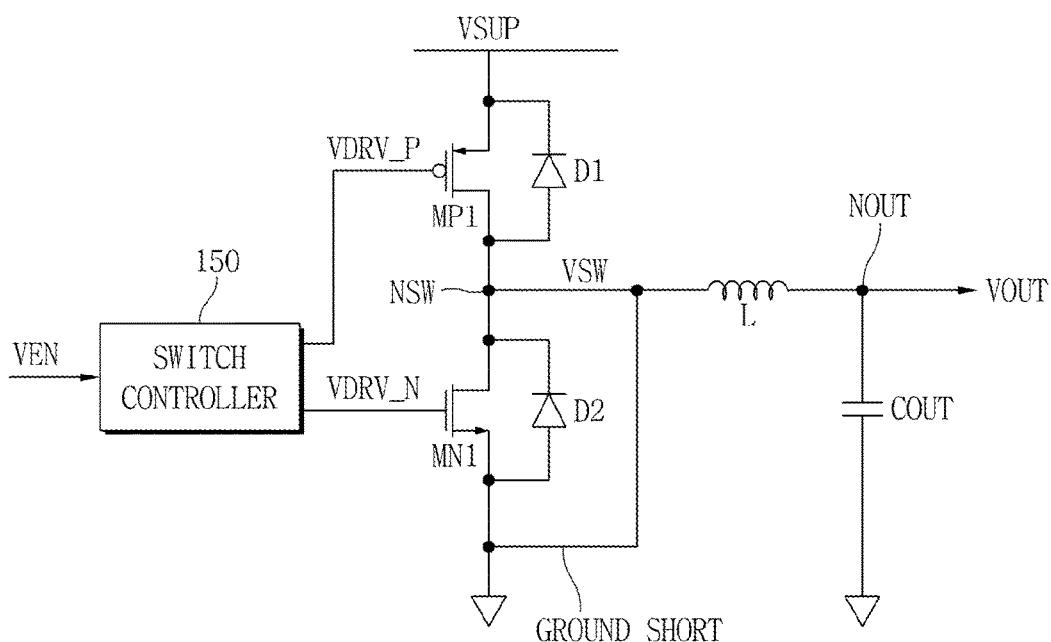
FIG. 6 is a circuit diagram illustrating a switch control circuit and a power stage of power converters in the power management system of FIG. 1 in accordance with an embodiment of the inventive concept.

FIG. 6 is a circuit diagram illustrating a switch control circuit and a power stage of power converters in the power management system of FIG. 1 where a switch node of the power stage is shorted to a ground voltage.

Where the protection state is generated, e.g., where switch node NSW of the power stage is shorted to the ground voltage as described with reference to FIG. 4, power management system 100 of FIG. 1 may operate as follows.

Where switch node NSW of the power stage is shorted to the ground voltage, static protecting circuit 130 detects a voltage VSW1 of switch node NSW of power stage 160, and enables protection signal PT_FLAG_1. Where protection signal PT_FLAG_1 is enabled, main controller 110 disables enable signal VEN1 based on protection signal PT_FLAG_1. Under these conditions, switch controller 150 is disabled, and switch driving signal VDRV1 is disabled. Switch driving signal VDRV1 comprises first switch driving signal VDRV_P and second switch driving signal VDRV_N. Where switch node NSW of the power stage is shorted to the ground voltage, first switch driving signal VDRV_P has a logic high state and second switch driving signal VDRV_N has a logic low state. Under these conditions, both PMOS transistor MP1 and NMOS transistor MN1 are turned off. Therefore, where switch node NSW of the power stage is shorted to the ground voltage, damage to PMOS transistor MP1 is prevented by turning off PMOS transistor MP1.

Further, where switch node NSW of the power stage is shorted to the ground voltage, static protecting circuit 130 may be disabled in response to enable signal VEN1 received from main controller 110.

Referring again to FIG. 1, where power converters 120_1 to 120_n include first power converters in which switch node NSW of the power stage is shorted to the ground voltage, the first power converters may generate and provide respective protection signals PT_FLAG_1 to PT_FLAG_n to main controller 110, and main controller 110 may disable enable signals VEN1 to VENn applied to the first power converters based on protection signals PT_FLAG_1 to PT_FLAG_n.

Figure 7:
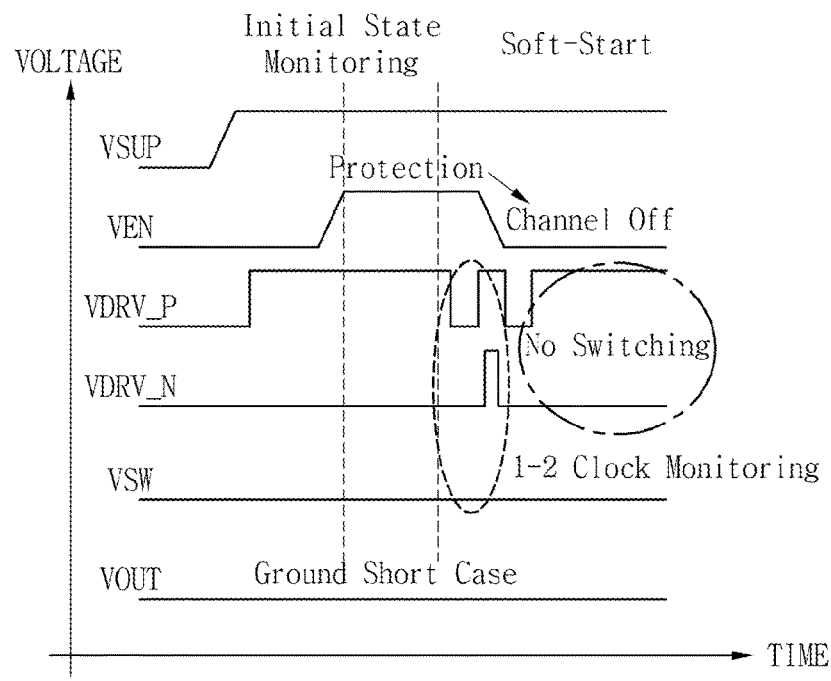
FIG. 7 is a timing diagram illustrating operations of the power management system of FIG. 1 in accordance with an embodiment of the inventive concept.
Figure 8:
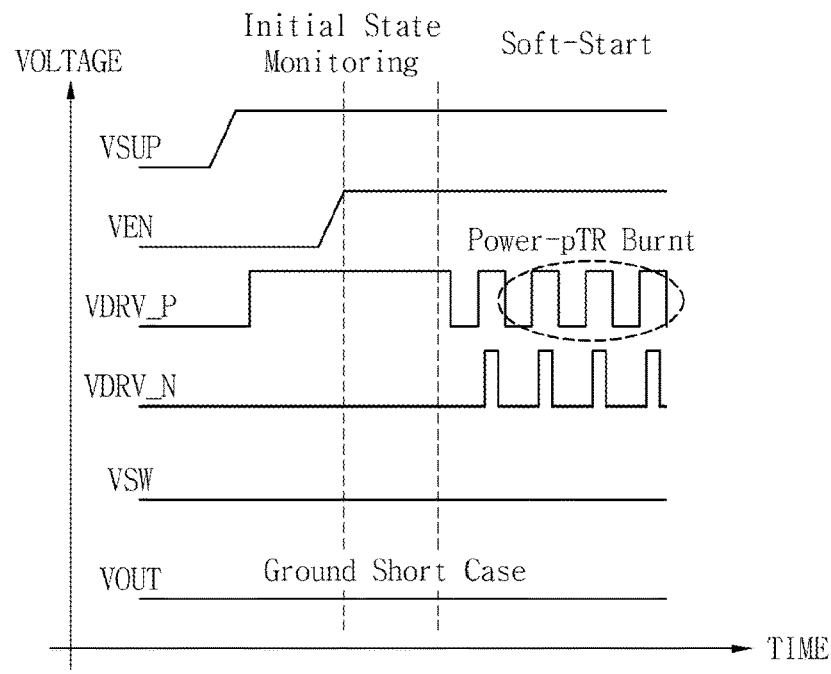
FIG. 8 is a timing diagram illustrating operations of the reference power management system of FIG. 5.

FIG. 7 is a timing diagram illustrating operations of the power management system of FIG. 1 where a switch node of the power stage is shorted to the ground voltage, and FIG. 8 is a timing diagram illustrating operations of the reference power management system of FIG. 5 where a switch node of the power stage is shorted to the ground voltage.

Referring to FIG. 7, where switch node NSW of the power stage is shorted to the ground voltage and a voltage VSW of switch node NSW of the power stage is equal to the ground voltage, main controller 110 monitors one or two clocks and then disables enable signal VEN and maintains first switch driving signal VDRV_P that drives PMOS power transistor MP1 at a logic high state and second switch driving signal VDRV_N that drives NMOS power transistor MM1 at a logic low state. Under these conditions, PMOS power transistor MP1 and NMOS power transistor MN1 do not perform a switching operation. Therefore, where switch node NSW of the power stage is shorted to the ground voltage, damage to PMOS power transistor MP1 is prevented.

Referring to FIG. 8, in the reference power management system, where switch node NSW of the power stage is shorted to the ground voltage, both first switch driving signal VDRV_P and second switch driving signal VDRV_N have pulse waveforms, and PMOS power transistor MP1 and NMOS power transistor MN1 perform a switching operation. Therefore, in the reference power management system, where switch node NSW of the power stage is shorted to the ground voltage, the PMOS power transistor may be damaged.

Figure 9:
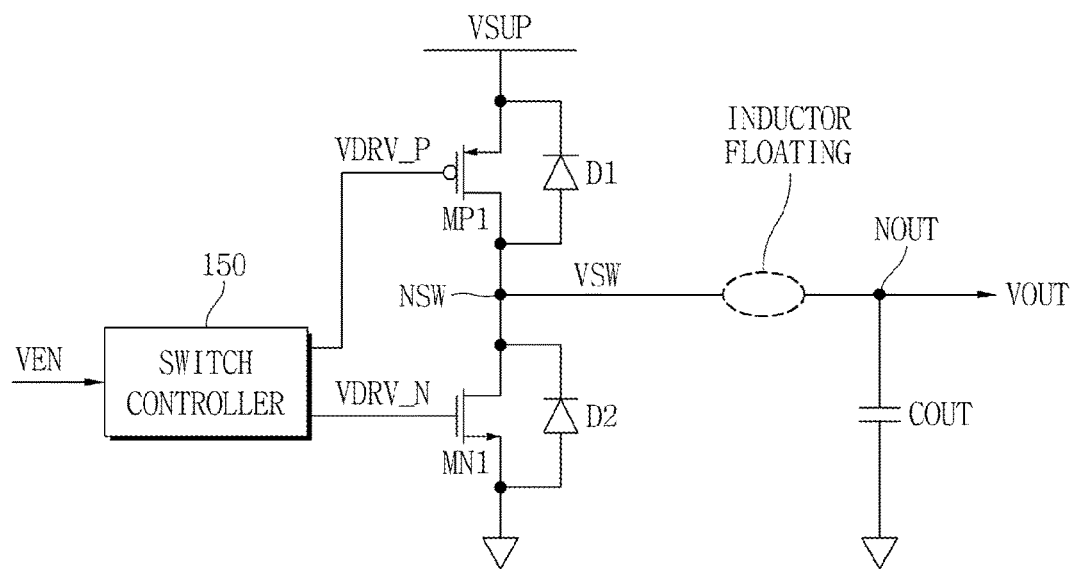
FIG. 9 is a circuit diagram illustrating a switch control circuit and a power stage of power converters in the power management system of FIG. 1 in accordance with an embodiment of the inventive concept.

FIG. 9 is a circuit diagram illustrating a switch control circuit and a power stage of power converters in the power management system of FIG. 1 in accordance with an embodiment of the inventive concept. In the example of FIG. 9, an inductor in an L-C circuit is floated from the switch node of the power stage.

Where the protection state is generated, for example, where the inductor in the L-C circuit is floated from switch node NSW of the power stage as described in FIG. 9, power management system 100 of FIG. 1 including the power stage of FIG. 9 may operate as follows.

Where the inductor in the L-C circuit is floated from switch node NSW of the power stage, static protecting circuit 130 detects a voltage VSW1 of switch node NSW of power stage 160, and enables protection signal PT_FLAG_1. Where protection signal PT_FLAG_1 is enabled, main controller 110 disables enable signal VEN1 based on protection signal PT_FLAG_1. Under these conditions, switch controller 150 is disabled, and then switch driving signal VDRV1 is disabled. Switch driving signal VDRV1 comprises first switch driving signal VDRV_P and second switch driving signal VDRV_N.

Where the inductor in the L-C circuit is floated from switch node NSW of the power stage, first switch driving signal VDRV_P has a logic high state and second switch driving signal VDRV_N has a logic low state. Under these conditions, both PMOS transistor MP1 and NMOS transistor MN1 are turned off. Therefore, PMOS transistor MP1 and NMOS transistor MN1 do not perform a switching operation, and the power converters in power management system 100 may decrease power consumption. Further, the power converters may prevent degradation of the reliability of PMOS transistor MP1 and NMOS transistor MN1.

Additionally, where the inductor in the L-C circuit is floated from switch node NSW of the power stage, static protecting circuit 130 may be disabled in response to enable signal VEN1 received from main controller 110.

Figure 10:
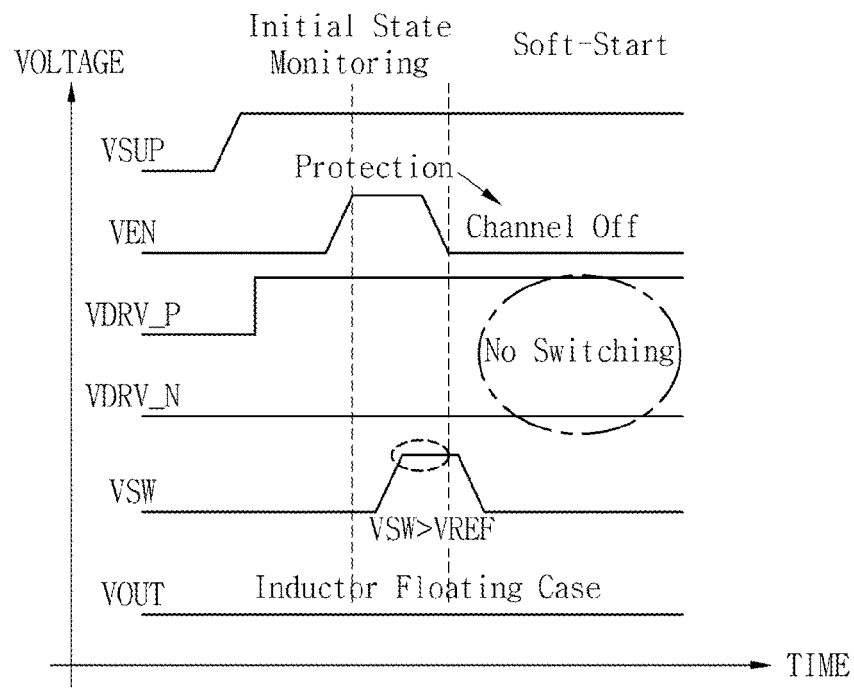
FIG. 10 is a timing diagram illustrating operations of the power management system of FIG. 1 in accordance with an embodiment of the inventive concept.
Figure 11:
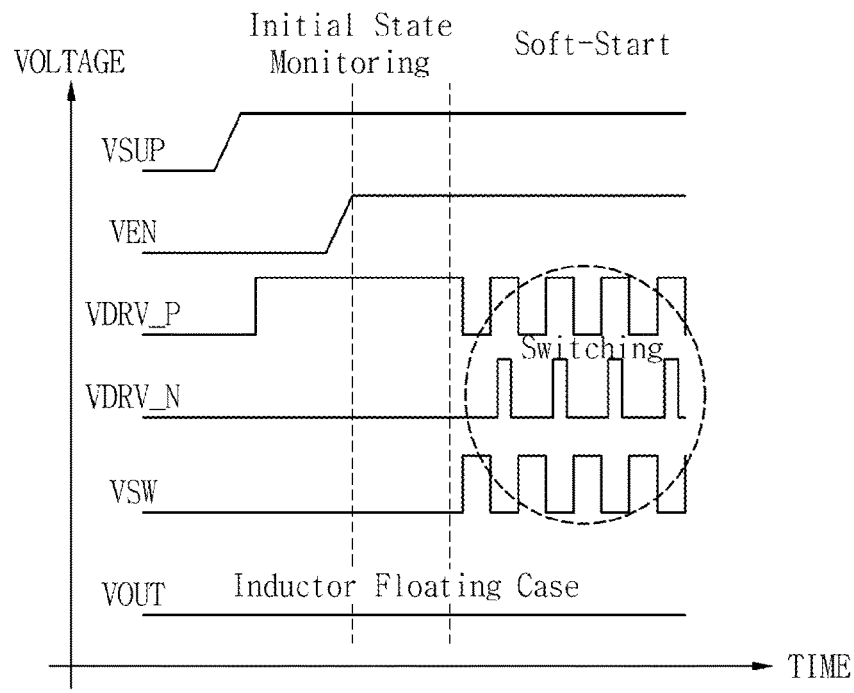
FIG. 11 is a timing diagram illustrating operations of the reference power management system of FIG. 5.

FIG. 10 is a timing diagram illustrating operations of the power management system of FIG. 1 where an inductor in an L-C circuit is floated from the switch node of the power stage, and FIG. 11 is a timing diagram illustrating operations of the reference power management system of FIG. 5 where an inductor in an L-C circuit is floated from the switch node of the power stage.

Referring to FIG. 10, where the inductor in the L-C circuit is floated from switch node NSW of the power stage, and a voltage VSW of switch node NSW of the power stage is higher than a reference voltage VREF, main controller 110 disables enable signal VEN and maintains first switch driving signal VDRV_P that drives PMOS power transistor MP1 at a logic high state and second switch driving signal VDRV_N that drives NMOS power transistor MN1 at a logic low state. Under these conditions, PMOS power transistor MP1 and NMOS power transistor MN1 do not perform a switching operation.

Therefore, where the inductor in the L-C circuit is floated from switch node NSW of the power stage, PMOS transistor MP1 and NMOS transistor MN1 do not perform a switching operation, and the power converters in power management system 100 may reduce power consumption. Further, the power converters may prevent degradation of the reliability of PMOS transistor MP1 and NMOS transistor MN1.

Referring to FIG. 11, in the reference power management system, where the inductor in the L-C circuit is floated from switch node NSW of the power stage, both first switch driving signal VDRV_P and second switch driving signal VDRV_N have pulse waveforms, and PMOS power transistor MP1 and NMOS power transistor MN1 perform a switching operation. Further, voltage VSW of switch node NSW of the power stage may have pulse waveforms. Therefore, in the reference power management system, where the inductor in the L-C circuit is floated from switch node NSW of the power stage, power converters in the reference power management system may reduce power consumption. Further, the power converters may decrease reliability of PMOS transistor MP1 and NMOS transistor MN1.

Figure 12:
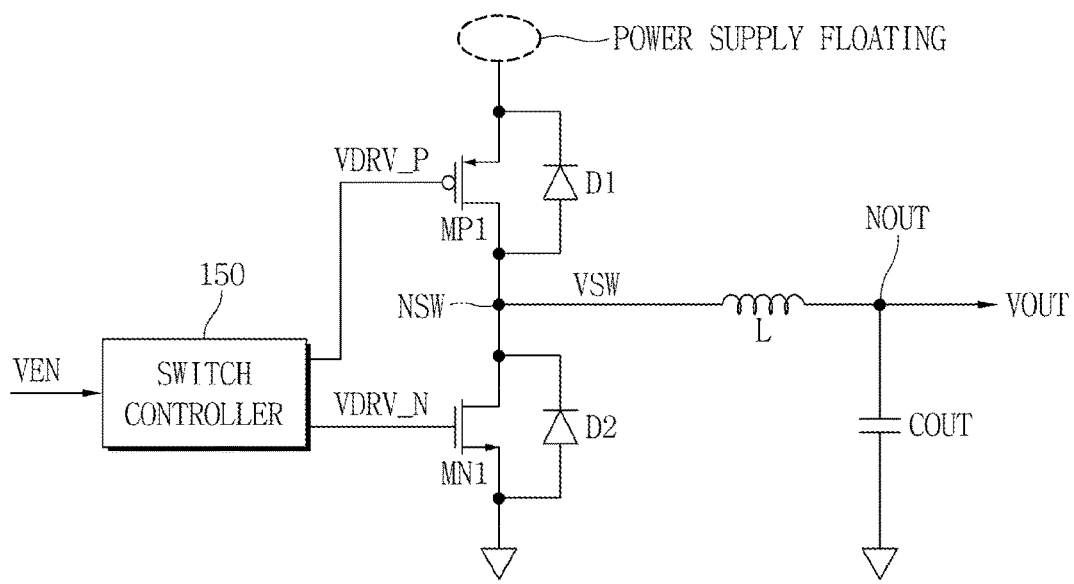
FIG. 12 is a circuit diagram illustrating a switch control circuit and a power stage of power converters in the power management system of FIG. 1 in accordance with an embodiment of the inventive concept.

FIG. 12 is a circuit diagram illustrating a switch control circuit and a power stage of power converters in the power management system of FIG. 1 where a DC power supply voltage is floated from the power stage.

Where the protection state is generated, for example, where the DC power supply voltage is floated from the power stage as described in FIG. 12, power management system 100 of FIG. 1 including the power stage of FIG. 12 may operate as follows.

Where the DC power supply voltage is floated from the power stage, static protecting circuit 130 detects a voltage VSW1 of switch node NSW of power stage 160, and enables protection signal PT_FLAG_1. Where protection signal PT_FLAG_1 is enabled, main controller 110 disables enable signal VEN1 based on protection signal PT_FLAG_1. Under these conditions, switch controller 150 is disabled, and then switch driving signal VDRV1 is disabled. Switch driving signal VDRV1 comprises first switch driving signal VDRV_P and second switch driving signal VDRV_N.

Where the DC power supply voltage is floated from the power stage, first switch driving signal VDRV_P has a logic high state and second switch driving signal VDRV_N has a logic low state. Under these conditions, both PMOS transistor MP1 and NMOS transistor MN1 are turned off. Therefore, PMOS transistor MP1 and NMOS transistor MN1 do not perform a switching operation, and the power converters in power management system 100 may decrease power consumption. Further, the power converters may prevent degradation of the reliability of PMOS transistor MP1 and NMOS transistor MN1. Further, where the DC power supply voltage is floated from the power stage, static protecting circuit 130 may be disabled in response to enable signal VEN1 received from main controller 110.

Figure 13:
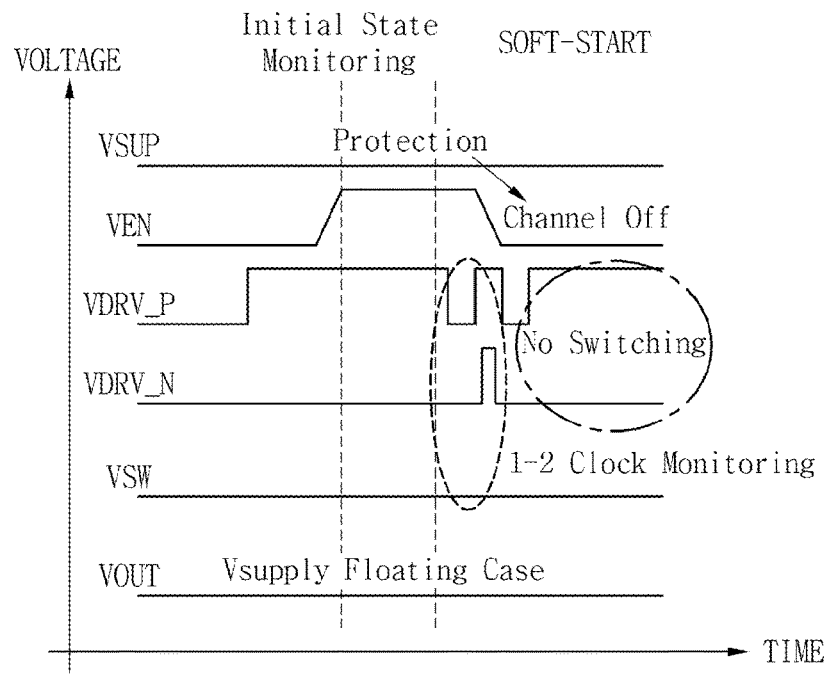
FIG. 13 is a timing diagram illustrating operations of the power management system of FIG. 1 in accordance with an embodiment of the inventive concept.
Figure 14:
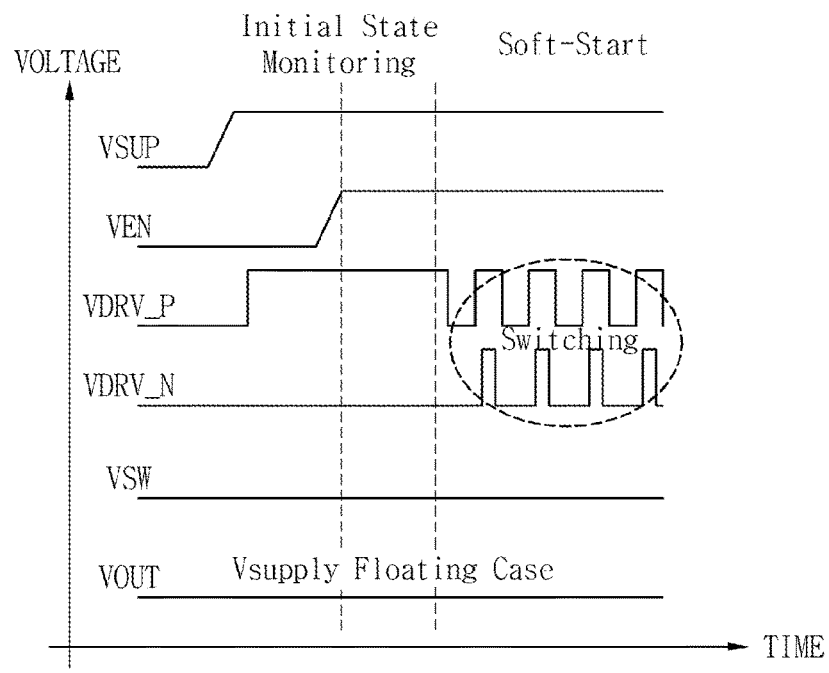
FIG. 14 is a timing diagram illustrating operations of the reference power management system of FIG. 5.

FIG. 13 is a timing diagram illustrating operations of the power management system of FIG. 1 where a DC power supply voltage is floated from the power stage, and FIG. 14 is a timing diagram illustrating operations of the reference power management system of FIG. 5 where a DC power supply voltage is floated from the power stage.

Referring to FIG. 13, where the DC power supply voltage is floated from the power stage, main controller 110 monitors one or two clocks and then disables enable signal VEN and maintains first switch driving signal VDRV_P that drives PMOS power transistor MP1 at a logic high state and second switch driving signal VDRV_N that drives NMOS power transistor MN1 at a logic low state. Under these conditions, PMOS power transistor MP1 and NMOS power transistor MN1 do not perform a switching operation.

Therefore, where the DC power supply voltage is floated from the power stage, PMOS transistor MP1 and NMOS transistor MN1 do not perform a switching operation, and the power converters in power management system 100 may decrease power consumption. Further, the power converters may prevent degradation of the reliability of PMOS transistor MP1 and NMOS transistor MN1.

Referring to FIG. 14, in the reference power management system, where the DC power supply voltage is floated from the power stage, both first switch driving signal VDRV_P and second switch driving signal VDRV_N have pulse waveforms, and PMOS power transistor MP1 and NMOS power transistor MN1 perform a switching operation. Therefore, in the reference power management system, where the DC power supply voltage is floated from the power stage, power converters in the reference power management system may need unnecessary power consumption. Further, the power converters may decrease reliability of PMOS transistor MP1 and NMOS transistor MN1.

Figure 15:
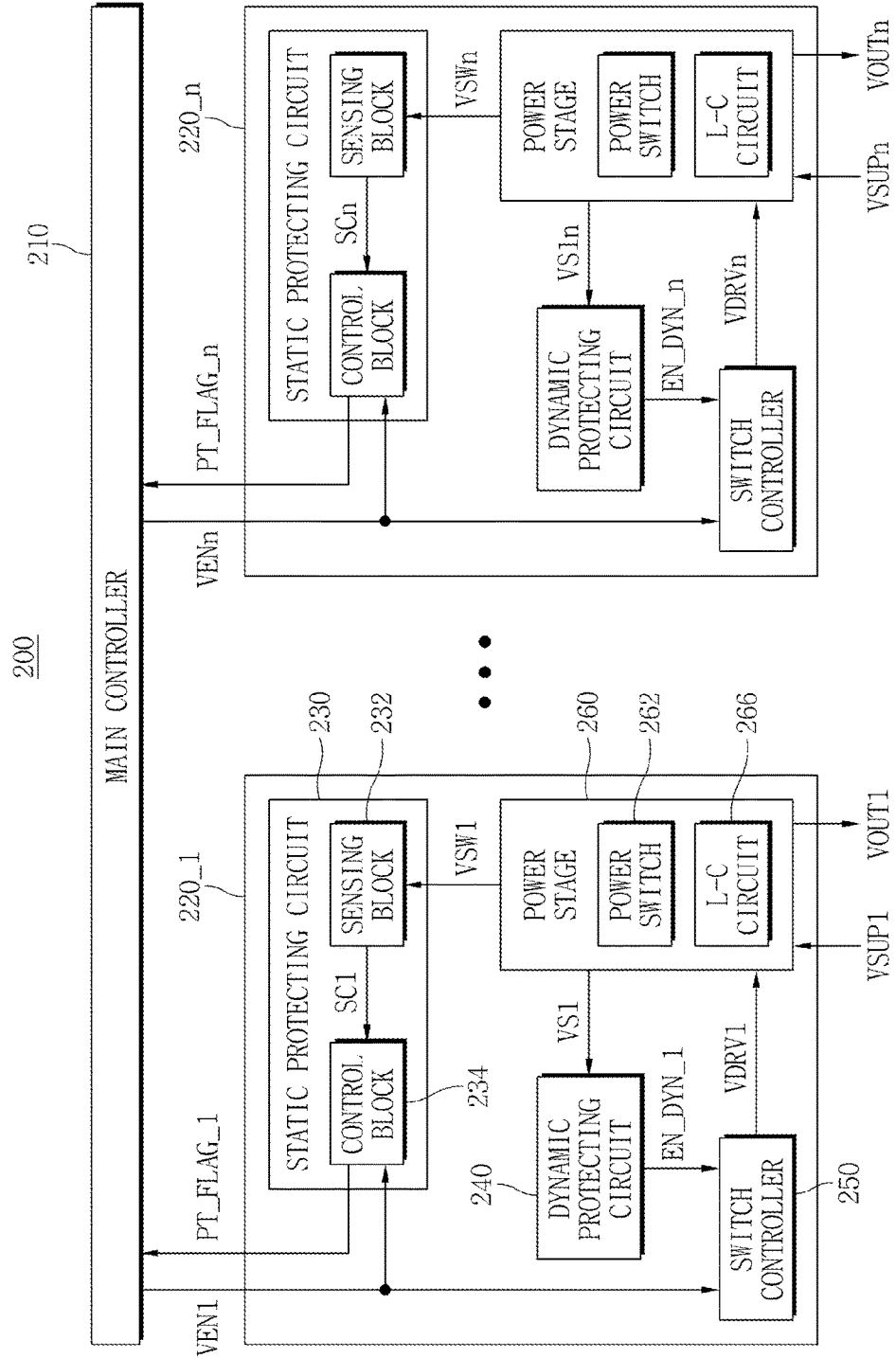
FIG. 15 is a block diagram illustrating a power management system in accordance with another embodiment of the inventive concept.

FIG. 15 is a block diagram illustrating a power management system 200 in accordance with another embodiment of the inventive concept.

Referring to FIG. 15, power management system 200 comprises power converters 220_1 to 220_n and a main controller 210. Each of power converters 220_1 to 220_n comprises a power stage 260 and is configured to detect an abnormal static state of power stages 260 to generate respective protection signals PT_FLAG_1 to PT_FLAG_n, and to stabilize DC power supply voltages VSU1 to VSUPn in response to respective enable signals VEN1 to VENn to generate DC output voltages VOUT1 to VOUTn. Main controller 210 is configured to generate enable signals VEN1 to VENn for the respective power converters 220_1 to 220_n based on the respective protection signals PT_FLAG_1 to PT_FLAG_n received from the respective power converters 220_1 to 220_n.

Each of power converters 220_1 to 220_n comprises a static protecting circuit 230, a switch controller 250, power stage 260, and a dynamic protecting circuit 240. Power management system 200 of FIG. 15 may further comprise dynamic protecting circuit 240 in power management system 100 of FIG. 1. Dynamic protecting circuit 240 protects power converters in power management system 200 when protection states are generated in the system when the system operates in the normal operating mode.

Power management system 200 of FIG. 15 may operate similarly to power management system 100 of FIG. 1. Therefore, the operation of power management system 200 will not be described here.

Figure 16:
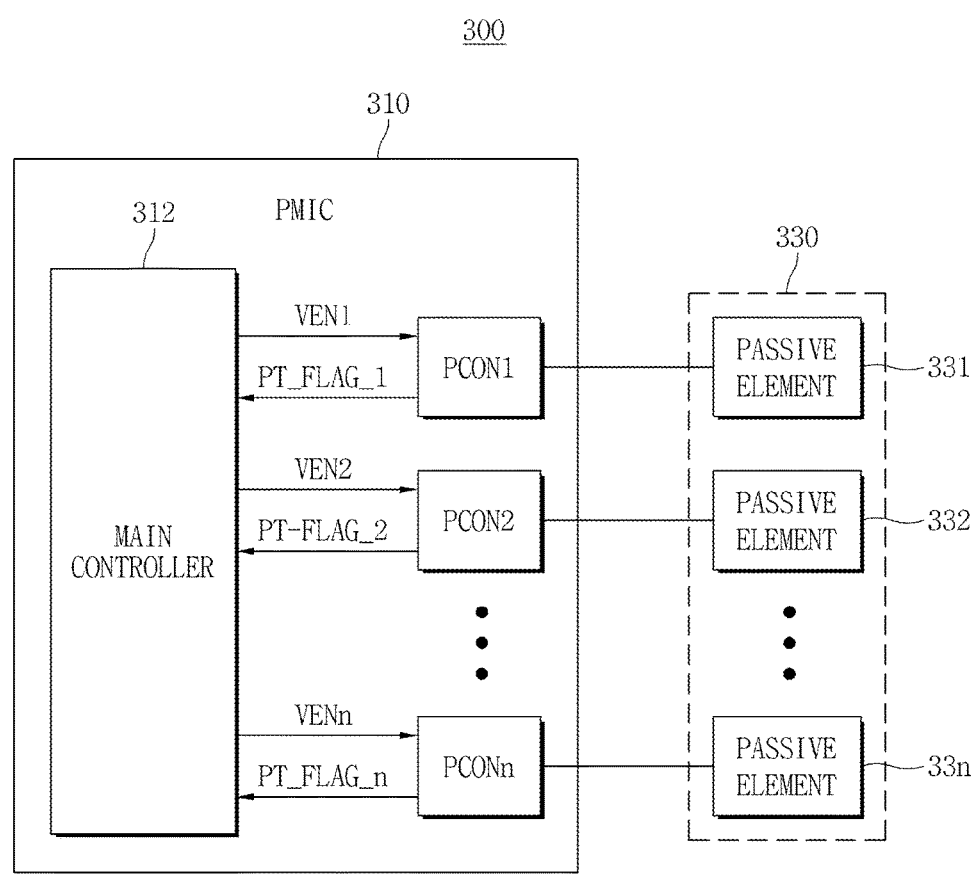
FIG. 16 is a block diagram illustrating a power management system in accordance with still another embodiment of the inventive concept.

FIG. 16 is a block diagram illustrating a power management system 300 in accordance with still another embodiment of the inventive concept.

Referring to FIG. 16, power management system 300 may include a PMIC 310 and a passive circuit 330. PMIC 310 comprises power converters PCON1 to PCONn and a main controller 312. Each of power converters PCON1 to PCONn comprises a power stage and is configured to detect an abnormal static state of power stages 160 to generate respective protection signals PT_FLAG_1 to PT_FLAG_n, and to stabilize a DC power supply voltage in response to respective enable signals VEN1 to VENn to generate a DC output voltage. Main controller 312 is configured to generate enable signals VEN1 to VENn for the respective power converters PCON1, PCON2, and PCON3 based on the respective protection signals PT_FLAG_1 to PT_FLAG_n received from the respective power converters PCON1, PCON2, and PCON3.

Passive circuit 330 may include passive elements 331 to 33n, and passive elements 331 to 33n may be disposed outside of PMIC 310 and connected to corresponding power converters PCON1 to PCONn. Where first power converters, in which the abnormal static state is generated, exist in power converters PCON1 to PCONn, main controller 312 may disable the first power converters.

Although the foregoing description presents several embodiments in which a power management system comprises buck converters, the inventive concept is not limited thereto. For example, in alternative embodiments the buck converters could be replaced by boost converters or buck-boost converters.

As indicated by the foregoing, in power management systems including a static protecting circuit, damage to power transistors can be prevented and relatively low power consumption and high reliability can be achieved.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A power management system, comprising:
   a power converter, comprising:
      a power stage configured to stabilize a direct current (DC) power supply voltage in response to an enable signal to generate a DC output voltage, and
      a protecting circuit configured to:
         detect a first state in which a switch node of the power stage is shorted to the DC power supply voltage, and in response thereto generate a protection signal indicating an abnormal state of the power stage;
         detect a second state in which the switch node of the power stage is shorted to a ground voltage, and in response thereto generate the protection signal indicating the abnormal state of the power stage;
         detect a third state in which an inductor in an inductor-capacitor circuit of the power stage is floated from the switch node of the power stage, and in response thereto generate a protection signal indicating the abnormal state of the power stage; and
         detect a fourth state in which the DC power supply voltage is floated from the power stage, and in response thereto generate a protection signal indicating the abnormal state of the power stage; and
      a main control circuit configured to generate the enable signal for the power converter based on the protection signal received from the power converter.

2. The power management system of claim 1, further comprising at least one additional power converter comprising an additional power stage and configured to detect an abnormal static state of the additional power stage, to generate an additional protection signal in response to the detection of the abnormal static state of the additional power stage, and to stabilize the DC power supply voltage in response to an additional enable signal to generate a DC output voltage,
   wherein the main control circuit is configured to generate the additional enable signal for the additional power converter based on the protection signal received from the additional power converter.

3. The power management system of claim 2, wherein, where first power converters among the power converter and the at least one additional power converter each generate the abnormal static state, the main control circuit disables the first power converters.

4. The power management system of claim 3, wherein where the abnormal static state is generated in each of the first power converters, each of the first power converters generates and provides a corresponding protection signal to the main control circuit, and the main control circuit disables enable signals applied to the first power converters based on the protection signals.

5. The power management system of claim 1, wherein the power converter comprises:
   the protecting circuit configured to be enabled in response to the enable signal, to detect a voltage of the switch node of the power stage, and to generate the protection signals; and
   a switch control circuit configured to be enabled in response to the enable signal, and to generate a switch driving signal,
   wherein the power stage comprises a power switch and the inductor-capacitor circuit and is configured to stabilize the DC power supply voltage in response to the switch driving signal to generate the DC output voltage.

6. The power management system of claim 5, wherein the protecting circuit comprises:
   a sensing block configured to detect the voltage of the switch node of the power stage to generate a sensing signal; and
   a control block configured to generate the protection signals based on the enable signal and the sensing signal.

7. The power management system of claim 5, wherein the protecting circuit, the switch control circuit, and the power switch are embedded in one power management integrated circuit (PMIC).

8. The power management system of claim 5, further comprising: a dynamic protecting circuit configured to receive a sensing voltage from the power stage and generate a dynamic enable signal based on the sensing voltage to provide to the switch control circuit.

9. The power management system of claim 5, wherein the power stage comprises:
   a first power switch connected between the DC power supply voltage and the switch node of the power stage, and configured to perform a switch operation in response to a first switch driving signal;
   a second power switch connected between the switch node of the power stage and a ground voltage, and configured to perform a switch operation in response to a second switch driving signal;
   the inductor connected between the switch node of the power stage and an output node; and
   the capacitor connected between the output node and the ground voltage.

10. The power management system of claim 9, wherein the main control circuit disables the power converter, where a switch node of the power stage is shorted to the DC power supply voltage.

11. The power management system of claim 9, wherein the first power switch comprises:
   a PMOS power transistor connected between the DC power supply voltage and the switch node of the power stage, and configured to perform a switch operation in response to the first switch driving signal; and a diode having an anode connected to the switch node of the power stage and a cathode connected to the DC power supply voltage.

12. The power management system of claim 9, wherein the second power switch comprises:
   an NMOS power transistor connected between the switch node of the power stage and the ground voltage, and configured to perform a switch operation in response to the second switch driving signal; and
   a diode having an anode connected to the ground voltage and a cathode connected to the switch node of the power stage.

13. A method of controlling a power management system comprising a power converter, comprising:
   determining whether a protection state is generated in the power converter;
   disabling the power converter where the protection state is generated in the power management system, else enabling the power converter;
   determining whether a switch node of a power stage in the power converter is shorted to a direct current (DC) power supply voltage;
   as a consequence of determining that the switch node of the power stage in the power converter is shorted to the DC power supply voltage, disabling blocks related to power conversion in the power converter;
   determining whether an inductor in an inductor-capacitor circuit of the power stage is floated from the switch node of the power stage; and
   as a consequence of determining that the inductor in the inductor-capacitor circuit is floated from the switch node of the power stage, disabling blocks related to power conversion in the power converter.

14. The method of claim 13, wherein the power converter is disposed in a power management integrated circuit (PMIC).

15. The method of claim 14, wherein disabling the power converter comprises disabling blocks related to power conversion of the PMIC.

16. The method of claim 14, further comprising:
   determining whether the switch node of the power stage is shorted to a ground voltage;
   as a consequence of determining that the switch node of the power stage is shorted to the ground voltage, disabling the power converter;
   determining whether the DC power supply voltage is floated from the power stage;
   as a consequence of determining that the DC power supply voltage is floated from the power stage, disabling the power converter; and
   as a consequence of determining that the switch node of the power stage is not shorted to a ground voltage and that the DC power supply voltage is not floated from the power stage, performing a normal operation on the power converter.

17. The method of claim 14, further comprising turning on the PMIC, and determining whether the protection state is generated in the power converter upon turning on the PMIC.

18. A method of controlling a power management system comprising a power converter, comprising:
   determining whether a protection state is generated in the power converter;
   disabling the power converter where the protection state is generated in the power management system, else enabling the power converter;
   determining whether a switch node of a power stage in the power converter is shorted to a direct current (DC) power supply voltage or whether an inductor in an inductor-capacitor circuit of the power stage is floated from the switch node of the power stage; and
   as a consequence of determining that the switch node of the power stage in the power converter is shorted to the DC power supply voltage or that the inductor in the inductor-capacitor circuit is floated from the switch node of the power stage, disabling blocks related to power conversion in the power converter,
   further comprising, as a consequence of determining that the switch node of the power stage in the power converter is not shorted to the DC power supply voltage and that the inductor in the inductor-capacitor circuit is not floated from the switch node of the power stage, performing a soft-start operation on the power converter.

19. The method of claim 13, wherein the power converter comprises:
   a static protecting circuit configured to be enabled in response to an enable signal, to detect a voltage of the switch node of the power stage, and to generate protection signals; and
   a switch control circuit configured to be enabled in response to the enable signal, and to generate a switch driving signal,
   wherein the power stage comprises a power switch and the inductor-capacitor circuit and is configured to stabilize the DC power supply voltage in response to the switch driving signal to generate a DC output voltage.

* * * * *